United States Patent
Hirota (10) Patent No.: US 8,637,179 B2
(45) Date of Patent: Jan. 28, 2014

(54) SYSTEMS AND METHODS FOR MANUFACTURING A BATTERY USING A FOLDABLE COVERING MEMBER

(75) Inventor: Hiroyuki Hirota, Kanagawa (JP)

(73) Assignee: KYOCERA Corporation, Kyoto (JP)

(*) Notice: Subject to any disclaimer, the term of this patent is extended or adjusted under 35 U.S.C. 154(b) by 762 days.

(21) Appl. No.: 12/742,644

(22) PCT Filed: Nov. 26, 2008

(86) PCT No.: PCT/JP2008/071475
§ 371 (c)(1),
(2), (4) Date: Aug. 11, 2010

(87) PCT Pub. No.: WO2009/069673
PCT Pub. Date: Jun. 4, 2009

(65) Prior Publication Data
US 2011/0229744 A1    Sep. 22, 2011

(30) Foreign Application Priority Data

Nov. 29, 2007   (JP) ................................ 2007-309385

(51) Int. Cl.
*H01M 2/04* (2006.01)
*H01M 14/00* (2006.01)
*H01M 2/06* (2006.01)
*H01M 2/00* (2006.01)

(52) U.S. Cl.
USPC ............... 429/163; 429/7; 429/175; 429/177; 429/178; 29/623.1; 29/623.2

(58) Field of Classification Search
None
See application file for complete search history.

(56) References Cited

U.S. PATENT DOCUMENTS

| 6,570,362 B1 * | 5/2003 | Estes et al. ..................... 320/101 |
| 2009/0087734 A1 * | 4/2009 | Akatsuchi et al. ............ 429/178 |

FOREIGN PATENT DOCUMENTS

| JP | 2003-077441 | 3/2003 |
| JP | 2006-202629 | 8/2006 |
| JP | 2006-202655 | 8/2006 |
| JP | 2007-179812 | 7/2007 |

* cited by examiner

*Primary Examiner* — Kwang Han
(74) *Attorney, Agent, or Firm* — Procopio, Cory, Hargreaves & Savitch LLP (57) ABSTRACT

A battery which can be assembled by using reduced man-hours. The battery has a battery cell having a positive electrode terminal and a negative electrode terminal which are arranged on one side surface of the battery cell, a circuit board placed facing the one side surface of the battery cell and having a first board terminal and a second board terminal, a first conduction member for conducting the positive electrode terminal and first board terminal to each other, a second conductive member for conducting the negative electrode terminal and the second board terminal to each other, a first cover placed between the circuit board and the battery cell, a second cover placed facing the first cover with the circuit board sandwiched between the first and second covers, a connection section for connecting the first and second covers to each other, and a cover for covering the circuit board. The circuit board is mounted to the one side surface of the battery cell while being sandwiched between the first and second covers.

13 Claims, 7 Drawing Sheets

SYSTEMS AND METHODS FOR MANUFACTURING A BATTERY USING A FOLDABLE COVERING MEMBER

TECHNICAL FIELD

The present invention relates to a battery used in an electronic device such as a cellular telephone, and an electronic device provided with the battery.

BACKGROUND ART

Conventionally, a battery including a substrate having a terminal and the like and a covering member for protecting the substrate on one face of a battery cell is known as a battery used in an electronic device such as a cellular telephone and a personal digital assistant.

For example, Patent Document 1 proposes a battery in which a substrate is disposed on one face side of a battery cell, including a covering member consisting of a top cover that protects the substrate from an upper face thereof and a bottom cover that supports the substrate from a bottom face side (a battery cell side) thereof.

[Patent Document 1] Japanese Unexamined Patent Application Publication No. 2006-202655

DISCLOSURE OF THE INVENTION

Problems to be Solved by the Invention

However, since the top cover and the bottom cover as the covering member are separate components in the battery disclosed in Patent Document 1, a step of attaching the top cover to the bottom cover is required and assembly man-hours increase in manufacturing of the battery.

Given this, the present invention aims at providing a battery that can reduce assembly man-hours in manufacturing and a portable electronic device provided with the battery.

Means for Solving the Problems

The present invention achieves the abovementioned objective by providing a battery including:

a battery cell having a positive terminal and a negative terminal that are disposed on one face thereof;

a circuit substrate that is disposed to face the one face of the battery cell, and includes a first substrate terminal and a second substrate terminal;

a first conductive member that causes conduction between the positive terminal and the first substrate terminal;

a second conductive member that causes conduction between the negative terminal and the second substrate terminal; and a covering member that includes a first covering portion having at least a part thereof disposed between the circuit substrate and the battery cell, a second covering portion that is disposed to face the first covering portion to interpose the circuit substrate, and a connection portion that foldably connects the first covering portion and the second covering portion, and that covers the circuit substrate, in which the circuit substrate is attached to the one face of the battery cell in a state of being interposed between the first covering portion and the second covering portion.

In addition, it is preferable that the first substrate terminal and the second substrate terminal are disposed on a face of the circuit substrate on a side that faces the one face of the battery cell, and the first conductive member and the second conductive member are folded along a folding direction of the first covering portion and the second covering portion.

In addition, it is preferable that the first conductive member and the second conductive member are respectively joined with the positive terminal and the negative terminal, by way of welding from an intersection direction that intersects with the one face, in a state in which the covering member is in an opened state without being folded by the connection portion, and are respectively joined with the first substrate terminal and the second substrate terminal by way of welding from the intersection direction.

In addition, it is preferable that the circuit substrate is supported by the second covering portion in a state in which the covering member is in the opened state and the first covering portion is joined with the one face of the battery cell.

In addition, it is preferable that the covering member further includes an engaging portion that maintains a state in which the first covering portion and the second covering portion are folded back on one another.

In addition, it is preferable that the first covering portion is positioned with respect to the battery cell by the first conductive member joined with the positive terminal and the second conductive member joined with the negative terminal.

The present invention achieves the abovementioned objective by a battery manufacturing method including steps of:

attaching a foldable covering member in an opened state to one face of a battery cell on which a positive terminal and a negative terminal are disposed;

attaching a circuit substrate including a first substrate terminal and a second substrate terminal to the covering member in the opened state;

causing conduction between the positive terminal and the first substrate terminal by attaching a first conductive member to the covering member in the opened state, and causing conduction between the negative terminal and the second substrate terminal by attaching a second conductive member to the covering member in the opened state; and covering the circuit substrate by folding the covering member in the opened state to which the circuit substrate, the first conductive member, and the second conductive member are attached.

In addition it is preferable that, in a state in which the covering member is in the opened state, the first conductive member and the second conductive member are welded respectively to the positive terminal and the negative terminal from an intersection direction that intersects with the one face, and are respectively welded to the first substrate terminal and the second substrate terminal from the intersection direction.

The present invention achieves the abovementioned objective by a portable electronic device having a portable electronic device main body and a battery mounted in the portable electronic device main body, in which the battery includes:

a battery cell having a positive terminal and a negative terminal that are disposed on one face thereof;

a circuit substrate that is disposed to face the one face of the battery cell and includes a first substrate terminal and a second substrate terminal;

a first conductive member that causes conduction between the positive terminal and the first substrate terminal;

a second conductive member that causes conduction between the negative terminal and the second substrate terminal; and a covering member that includes a first covering portion having at least a part thereof disposed between the circuit substrate and the battery cell, a second covering portion that is disposed to face the first covering portion to interpose the circuit substrate, and a connection portion that foldably connects the first covering portion and the second covering portion, and that covers the circuit substrate, in which the circuit substrate is attached to the one face of the battery cell in a state of being interposed between the first covering portion and the second covering portion.

Effects of the Invention

According to the present invention, a battery of which assembly man-hours in manufacturing is reduced and a portable electronic device provided with the battery can be provided.

EXPLANATION OF REFERENCE NUMERALS

10 Battery
20 Battery cell
20a Upper face (one face)
21 Positive terminal
22 Negative terminal
30 Circuit substrate
30a First substrate terminal
30b Second substrate terminal
31 First conductive member
32 Second conductive member
33 External connection terminal
40 Covering member
41 First covering portion
42 Second covering portion
43 Connection portion
44 Engaging portion
44a Concave portion
44b Convex portion
45 Projecting portion
50 Label sheet
51 Notch

PREFERRED MODE FOR CARRYING OUT THE INVENTION

The present invention is described hereinafter based on a preferred embodiment thereof, with reference to FIGS. 1 to 4.

A battery 10 of the present embodiment is, for example, a secondary battery mounted in a portable electronic device such as a cellular telephone (not shown) and functions as a power source for an electronic element provided in the portable electronic device.

As shown in FIGS. 1 to 4, the battery 10 is provided with:
a battery cell 20 including a positive terminal 21 and a negative terminal 22 on an upper face 20a, which is the one face;
a circuit substrate 30 that is disposed to face the upper face 20a of the battery cell 20 and includes a first substrate terminal 30a and a second substrate terminal 30b;
a first conductive member 31 that causes conduction between the positive terminal 21 and the first substrate terminal 30a;
a second conductive member 32 that causes conduction between the negative terminal 22 and the second substrate terminal 30b; and
a covering member 40 that covers the circuit substrate 30. In addition, outer faces of the battery cell 20 other than the upper face 20a are covered by a label sheet 50.

Figure 3:
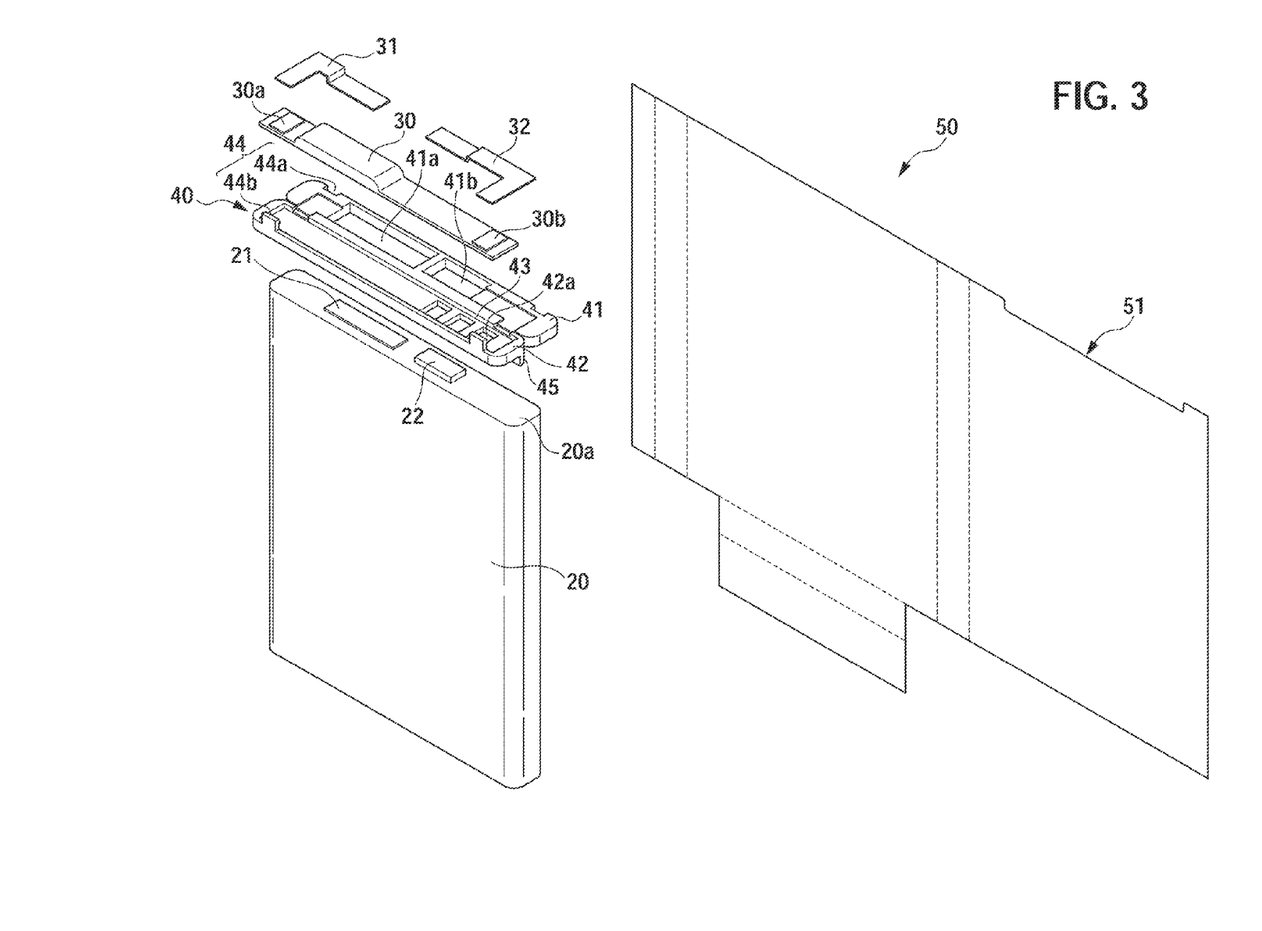
FIG. 3 is an exploded perspective view of the battery shown in FIG. 1.
Figure 4:
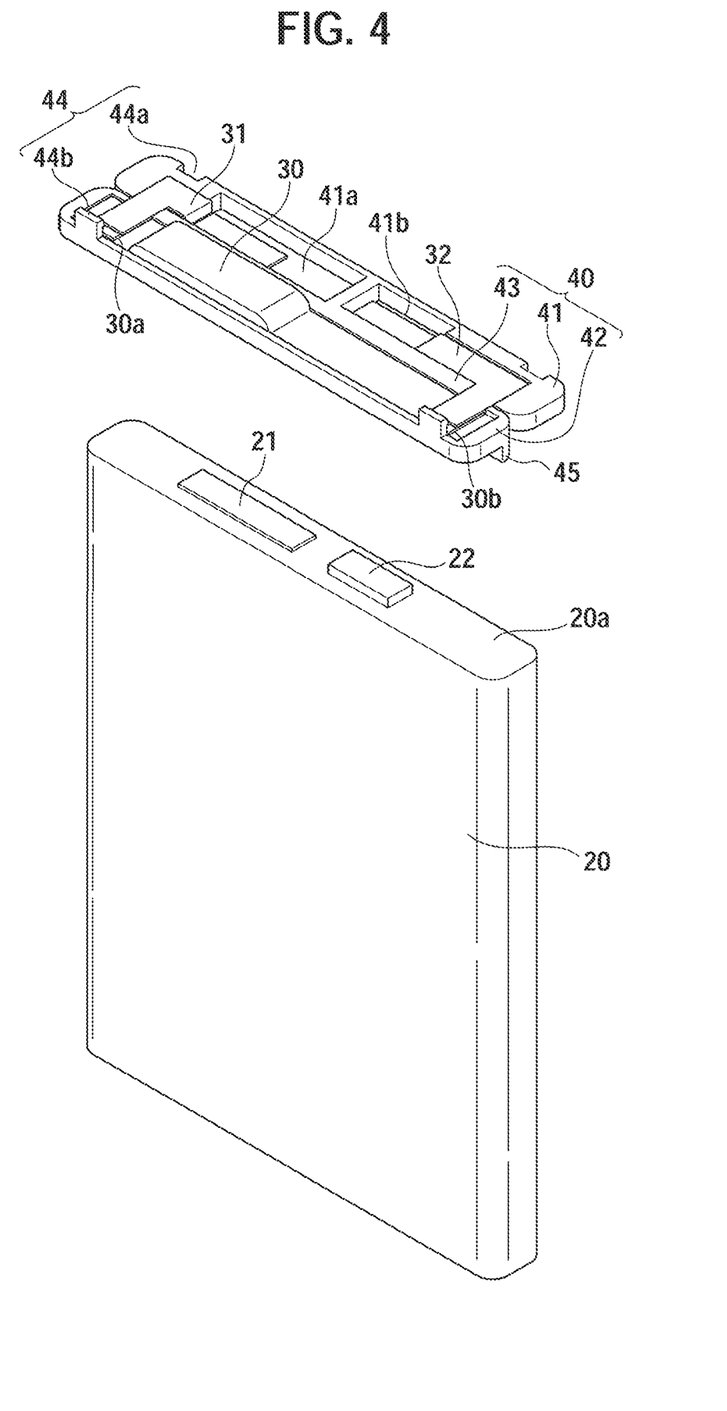
FIG. 4 is a perspective view showing a state in which the circuit substrate, the first conductive member and the second conductive member are disposed on the covering member in the battery shown in FIG. 1.

The battery cell 20 is formed in a rectangular plate shape as shown in FIGS. 3 and 4. The battery cell 20 is provided with the positive terminal 21 and the negative terminal 22 on the upper face 20a thereof. The upper face 20a of the battery cell 20 has an elongated rectangular shape. The negative terminal 22 projects from one side in a longitudinal direction of the upper face 20a of the battery cell 20.

Outer faces of the battery cell 20 are formed of, for example, a metallic material such as aluminum. On the outer faces of the battery cell 20, regions outside of the negative terminal 22 have a function of a positive terminal; however, in the present embodiment, a convex region formed, separately from the negative terminal 22, on the upper face 20a of the battery cell 20, a predetermined distance away from the negative terminal 22 in a longitudinal direction of the upper face 20a is described as the positive terminal 21.

Figure 1:
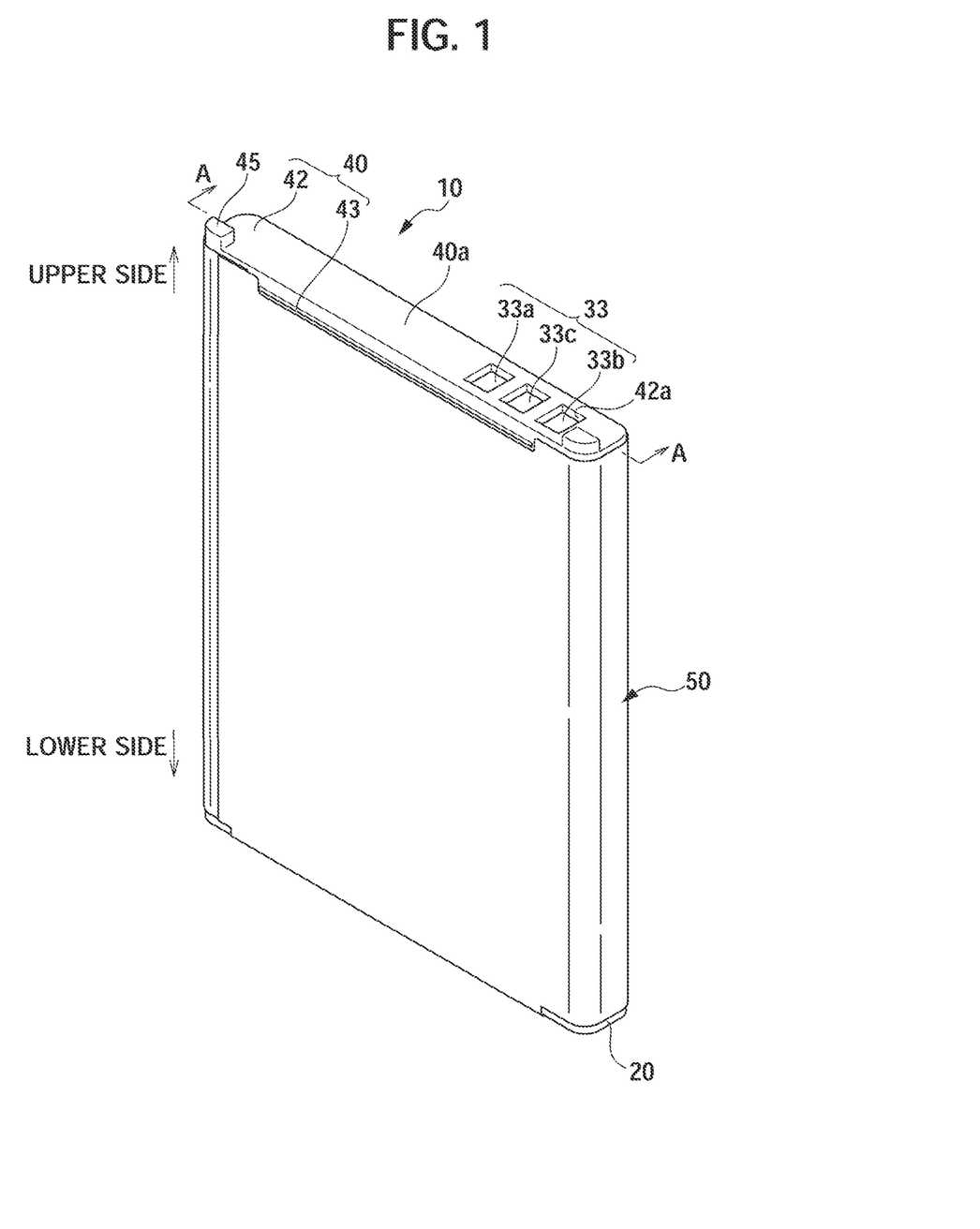
FIG. 1 is a perspective view showing an embodiment of a battery according to the present invention.

It should be noted that, in the present specification, a side of the battery cell 20 on which the positive terminal 21 and the negative terminal 22 are positioned is an upper side (see FIG. 1).

Figure 2:
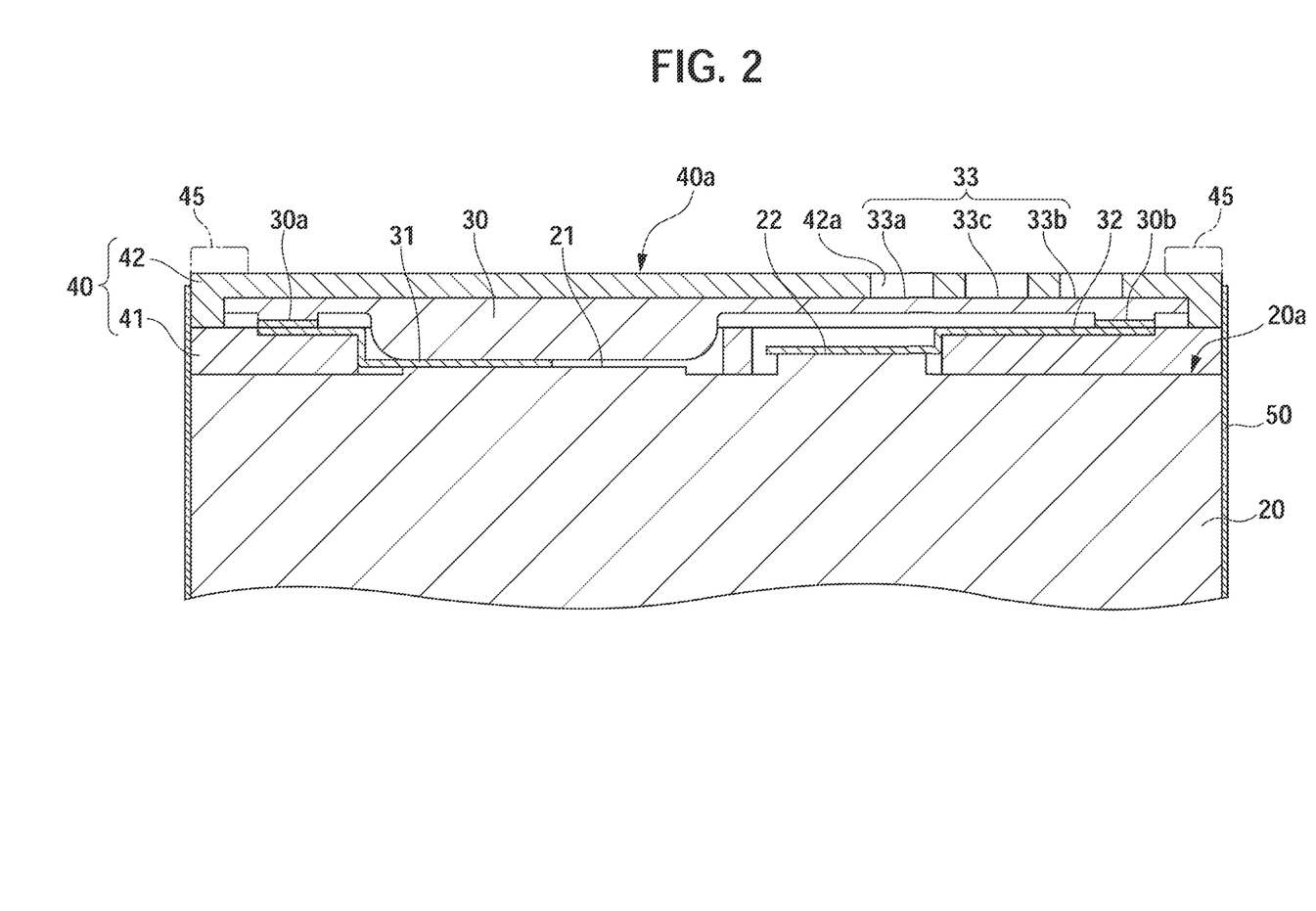
FIG. 2 is a cross-sectional view taken along a line A-A in FIG. 1.

The circuit substrate 30 is, as shown in FIGS. 2 and 3, an elongated plate-shaped member that is disposed to face the upper face 20a of the battery cell 20. The first substrate terminal 30a is provided in the vicinity of one side end portion in a longitudinal direction of the circuit substrate 30, and the second substrate terminal 30b is provided in the vicinity of the other side end portion in the longitudinal direction of the circuit substrate 30.

The first substrate terminal 30a is electrically connected to the positive terminal 21 of the battery cell 20 via the first conductive member 31. The second substrate terminal 30b is electrically connected to the negative terminal 22 of the battery cell 20 via the second conductive member 32. The first conductive member 31 and the second conductive member 32 are described later.

As shown in FIG. 2, a plurality of external connection terminals 33 is disposed on the circuit substrate 30, on a face opposite to the face on which the first substrate terminal 30a and the second substrate terminal 30b are provided. The external connection terminals 33 include a positive external terminal 33a, a negative external terminal 33b, and a communication terminal 33c.

The positive external terminal 33a is conductive with respect to the positive terminal 21 of the battery cell 20 via the first conductive member 31. The negative external terminal 33b is conductive with respect to the negative terminal 22 of the battery cell 20 via the second conductive member 32. The communication terminal 33c is used in order to provide various types of information regarding the battery 10 to an electronic device in which the battery 10 is mounted.

When the battery 10 is mounted in the electronic device, the external connection terminals 33 contact a terminal of a connector provided in the electronic device, thereby electrically connecting the battery 10 with the electronic device.

As shown in FIG. 2, the circuit substrate 30 is attached to the upper face 20a of the battery cell 20 in a state of being interposed between the first covering portion 41 and the second covering portion 42 constituting the covering member 40. In addition, the circuit substrate 30 is disposed such that the face on which the first substrate terminal 30a and the second substrate terminal 30b are provided faces the upper face 20a of the battery cell 20.

The covering member 40 is a member that fixes the circuit substrate 30, the first conductive member 31 and the second conductive member 32 to the battery cell 20. As shown in FIGS. 2 and 3, the covering member 40 includes:

the first covering portion 41, at least a part of which is disposed between the circuit substrate 30 and the battery cell 20;

the second covering portion 42 that is disposed on an opposite side to the first covering portion 41 across the circuit substrate 30; and the connection portion 43 that foldably connects the first covering portion 41 and the second covering portion 42. In the covering member 40, the first covering portion 41, the second covering portion 42, and the connection portion 43 are integrally formed. As a constituent material of the covering member 40, a synthetic resin material can be used, for example.

As shown in FIG. 3, the first covering portion 41 is a plate-like member. The outer shape of the first covering portion 41 is substantially the same as that of the upper face 20a of the battery cell 20. Openings 41a and 41b of shapes corresponding to the positive terminal 21 and the negative terminal 22, respectively, are formed on the first covering portion 41, at positions corresponding to the positive terminal 21 and the negative terminal 22 on the upper face 20a in a state in which the first covering portion 41 is attached to the upper face 20a of the battery cell 20.

The outer shape of the second covering portion 42 is substantially the same as that of the first covering portion 41. As shown in FIG. 3, openings 42a corresponding to shapes of the outer connection terminals 33, respectively, are formed at positions corresponding to the plurality of outer connection terminals 33 of the circuit substrate 30, respectively.

As shown in FIGS. 1 and 2, a pair of projecting portions 45, 45 is provided on the second covering portion 42, on a face opposite to the face on which the circuit substrate 30 is disposed. Each of the pair of projecting portions 45, 45 is formed on either end in a longitudinal direction of the second covering portion 42, on a lateral portion on one side along the longitudinal direction of the second covering portion 42. The pair of projecting portions 45, 45 functions as an attaching portion for fixing the battery 10 in a battery housing of the electronic device main body, when the battery 10 is mounted in the electronic device.

The connection portion 43 is configured by shaping a resin material composing the covering member 40 into a thin-wall, and connects a lateral portion on one side of the first covering portion 41 along a longitudinal direction and a lateral portion on one side of the second covering portion 42 along a longitudinal direction. The connection portion 43 is not formed in the vicinities of both end portions in a longitudinal direction of the first covering portion 41 and the second covering portion 42. In other words, the first covering portion 41 and the second covering portion 42 are spaced apart from each other in portions in the vicinities of both of the end portions in the longitudinal direction.

In a state in which the covering member 40 is in the opened state (a state shown in FIG. 3), the first covering portion 41 and the second covering portion 42 are adjacently disposed to be planar via the connection portion 43. The opened state of the covering member 40 is a state in which the first covering portion 41 and the second covering portion 42 are not folded by the connection portion 43.

The covering member 40 is configured to be switchable from the opened state to a closed state, as the first covering portion 41 and the second covering portion 42 are folded back on one another by folding 180 degrees at the connection portion 43. The closed state of the covering member 40 is a state in which the first covering portion 41 and the second covering portion 42 are folded back on one another.

As shown in FIGS. 3 and 4, the covering member 40 is provided with an engaging portion 44 that maintains the closed state of the covering member 40. The engaging portion 44 is composed of a pair of concave portions 44a, 44a provided in the first covering portion 41 and a pair of convex portions 44b, 44b provided in the second covering portion 42.

The pair of concave portions 44a, 44a is provided in the vicinities of both end portions in a longitudinal direction of a lateral portion of the first covering portion 41 on an opposite side to the connection portion 43. The pair of convex portions 44b, 44b is provided in the vicinities of both end portions in a longitudinal direction of a lateral portion of the second covering portion 42 on an opposite side to the connection portion 43.

In the closed state of the covering member 40, the pair of convex portions 44b, 44b provided in the second covering portion 42 engages with and is fixed to the pair of concave portions 44a, 44a provided in the first covering portion 41, whereby the closed state of the covering member 40 is maintained.

The first conductive member 31 is a conductive member that is formed in a band plate shape with a metallic material such as nickel and iron, and has a substantially L-shape. As shown in FIG. 4, the first conductive member 31 is disposed across a boundary between the first covering portion 41 and the second covering portion 42, on one end portion side of the covering member 40 in the opened state.

More specifically, the first conductive member 31 is disposed such that an end portion thereof on one side contacts the positive terminal 21 of the battery cell 20 via the opening 41a and an end portion thereof on the other side contacts the first substrate terminal 30a of the circuit substrate 30, in a state in which the first covering portion 41 is attached to the upper face 20a of the battery cell 20 and the circuit substrate 30 is disposed on the second covering portion 42.

It should be noted that the first conductive member 31 is disposed across a boundary between the first covering portion 41 and the second covering portion 42 in the vicinity of an end portion on one side in a longitudinal direction of the first covering portion 41 and the second covering portion 42 and that, in a region on the boundary in which the first conductive member 31 is disposed, the connection portion 43 is not formed.

The second conductive member 32 is also a conductive member formed in a band plate shape with a metallic material such as nickel and iron, and has a substantially L-shape. As shown in FIG. 4, the second conductive member 32 is disposed across a boundary between the first covering portion 41 and the second covering portion 42, on an end portion side, which is an opposite side to that on which the first conductive member 31 is disposed, of the covering member 40 in the opened state.

More specifically, the second conductive member 32 is disposed such that an end portion thereof on one side contacts the negative terminal 22 of the battery cell 20 via the opening 41b and an end portion thereof on the other side contacts the second substrate terminal 30b of the circuit substrate 30, in a state in which the first covering portion 41 is attached to the upper face 20a of the battery cell 20 and the circuit substrate 30 is disposed on the second covering portion 42.

It should be noted that the second conductive member 32 also is disposed across a boundary between the first covering portion 41 and the second covering portion 42 in the vicinity of an end portion in a longitudinal direction of the first covering portion 41 and the second covering portion 42 and that, in a region on the boundary in which the second conductive member 32 is disposed, the connection portion 43 is not formed.

The first conductive member 31 and the second conductive member 32 are conductively joined to the positive terminal 21 and the negative terminal 22 by means of welding from an intersection direction (from above in FIG. 4) that is a direction intersecting with the upper face 20a of the battery cell 20, in a state in which the covering member 40 is in the opened state. In addition, the first conductive member 31 and the second conductive member 32 are conductively joined also to the first substrate terminal 30a and the second substrate terminal 30b, by means of welding from the same vertical direction.

In other words, welding is performed from the same direction at a total of the four sites: welding of the first conductive member 31 to the positive terminal 21 and to the first substrate terminal 30a; and welding of the second conductive member 32 to the negative terminal 22 and to the second substrate terminal 30b. This welding can be performed by, for example, spot welding.

The first conductive member 31 and the second conductive member 32 are folded along a folding direction of the first covering portion 41 and the second covering portion 42 in a state in which the covering member 40 is in the closed state. More specifically, a portion of each of the first conductive member 31 and the second conductive member 32 that spans the first covering portion 41 and the second covering portion 42 is folded back and stacked in the vicinity of the boundary between the first covering portion 41 and the second covering portion 42. The portion of each of the first conductive member 31 and the second conductive member 32, which is folded back and stacked, contacts each other as shown in FIG. 2.

The label sheet 50 is an example of a covering member that covers the battery cell 20 and constitutes an outer face of the battery 10. On a front face of the label sheet 50 (an opposite face to a face facing the battery cell 20), for example, a model number and a standard of the battery, a manufacturer of an electronic device in which the battery is mounted, and the like are recorded (not shown).

The material of the label sheet 50 is not particularly limited and, for example, a synthetic resin material such as PET (polyethylene terephthalate) is used. As a material of the label sheet 50, in particular, a material having lower thermal conductivity than a material of an outer face of the battery cell 20 (in the present embodiment, for example, aluminum) is preferably used.

The label sheet 50 is composed of a piece of a sheet material, as shown in FIG. 3. In a state in which the covering member 40 is attached to the upper face 20a of the battery cell 20, the label sheet 50 covers substantially all faces of the battery cell 20 with the covering member 40 attached, except for the upper face 40a of the covering member 40 (see FIG. 1). It should be noted that the label sheet 50 may be configured to cover the upper face 40a of the covering member 40 except for regions in which the external connection terminals 33 and the projecting portion 45 are provided.

In other words, as shown in FIG. 2, a boundary portion between the battery cell 20 and the covering member 40 (the first covering portion 41), and a boundary portion between the first covering portion 41 and the second covering portion 42 are covered by the label sheet 50.

In a portion of the label sheet 50 that covers a face of the covering member 40 on which the connection portion 43 is provided, a notch 51 is formed as shown in FIG. 3 such that the connection portion 43 is exposed when the label sheet 50 is wrapped around the battery 10.

Next, a manufacturing method of the battery 10 of the present invention is described with reference to FIGS. 5A to 5D. FIGS. 5A to 5D are diagrams showing a manufacturing method of the battery 10 shown in FIG. 1.

Figure 5A:
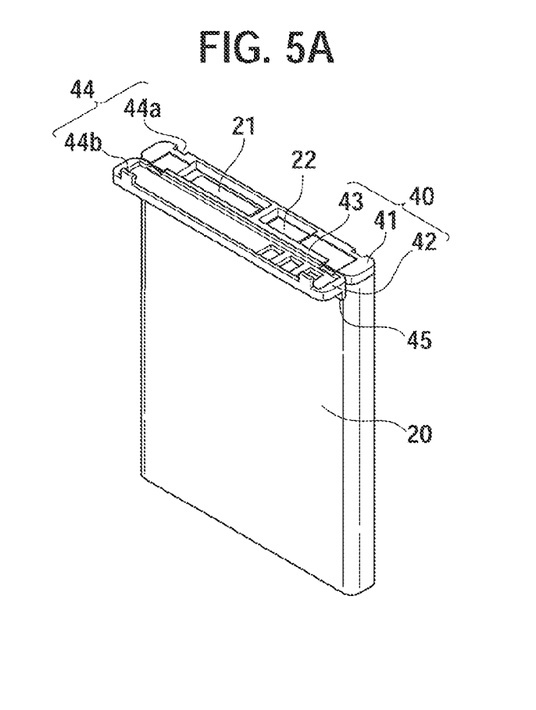
FIG. 5A is a diagram showing a manufacturing method of the battery shown in FIG. 1.

In the manufacturing method of the battery 10, first, the covering member 40 in the opened state is attached to the upper face 20a of the battery cell 20 as shown in FIG. 5A. In the covering member 40, the first covering portion 41 is adhered (temporarily fixed) to the upper face 20a of the battery cell 20 with an adhesive member (not shown) and the like.

Figure 5B:
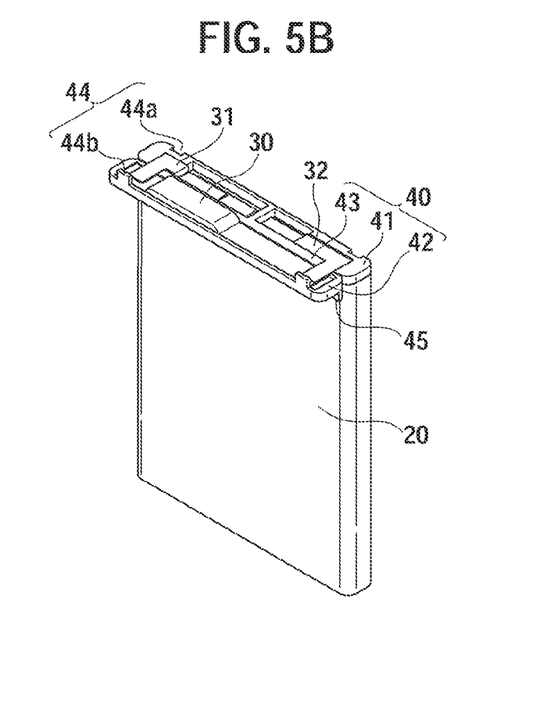
FIG. 5B is a diagram showing the manufacturing method of the battery shown in FIG. 1.

Next, as shown in FIG. 5B, the circuit substrate 30, the first conductive member 31, and the second conductive member 32 are mounted to the covering member 40 in the opened state attached to the battery cell 20.

In detail, the circuit substrate 30 is disposed in the second covering portion 42 of the covering member 40 in the opened state, to be positioned in a substrate housing portion formed on an inner face side (in FIG. 5A, upper face side) of the second covering portion 42, such that a face having the first substrate terminal 30a and the second substrate terminal 30b is directed upward.

After the circuit substrate 30 is disposed in the second covering portion 42, the first conductive member 31 and the second conductive member 32 are disposed to span the first covering portion 41 and the second covering portion 42, across a border therebetween.

The first conductive member 31 is disposed such that an end portion thereof on one side contacts the positive terminal 21 of the battery cell 20 via the opening 41a of the first covering portion 41 and an end portion thereof on the other side contacts the first substrate terminal 30a of the circuit substrate 30. The second conductive member 32 is also disposed such that an end portion thereof on one side contacts the negative terminal 22 of the battery cell 20 via the opening 41b of the first covering portion 41 and an end portion thereof on the other side contacts the second substrate terminal 30b of the circuit substrate 30. It should be noted that the first conductive member 31 and the second conductive member 32 are disposed to be positioned with respect to the covering member 40, by being inserted into a substantially L-shaped groove formed on the upper face of the first covering portion 41.

Thereafter, the first conductive member 31 and the second conductive member 32 disposed in the covering member 40 in the opened state are joined to the positive terminal 21 and the negative terminal 22 of the battery cell 20, and the first substrate terminal 30a and the second substrate terminal 30b of the circuit substrate 30, respectively, by spot welding. Joining of these four sites is performed from the same intersection direction that intersects with a surface direction of all of the upper face 20a (from above in FIG. 5) by spot welding.

Here, the first conductive member 31 and the positive terminal 21 are joined and the second conductive member 32 and the negative terminal 22 are joined, whereby the first covering portion 41 disposed between the first and second conductive members 31 and 32 and the upper face 20*a* of the battery cell 20 is firmly fixed by the battery cell 20.

Figure 5C:
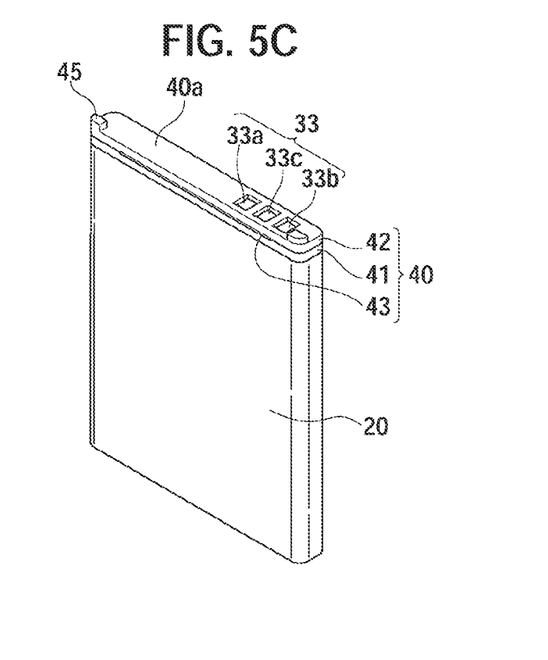
FIG. 5C is a diagram showing the manufacturing method of the battery shown in FIG. 1.

Next, as shown in FIG. 5C, the first covering portion 41 and the second covering portion 42 are folded back on one another by folding the covering member 40 approximately 180 degrees at the connection portion 43.

The covering member 40 is provided with the engaging portion 44 composed of the pair of concave portions 44*a*, 44*a* provided in the first covering portion 41 and the pair of convex portions 44*b*, 44*b* provided in the second covering portion 42 (see FIG. 5B). In a state in which the first covering portion 41 and the second covering portion 42 are folded back on one another (the closed state of the covering member 40), the pair of convex portions 44*b*, 44*b* engages with the pair of concave portions 44*a*, 44*a*, thereby maintaining the closed state of the covering member 40.

Figure 5D:
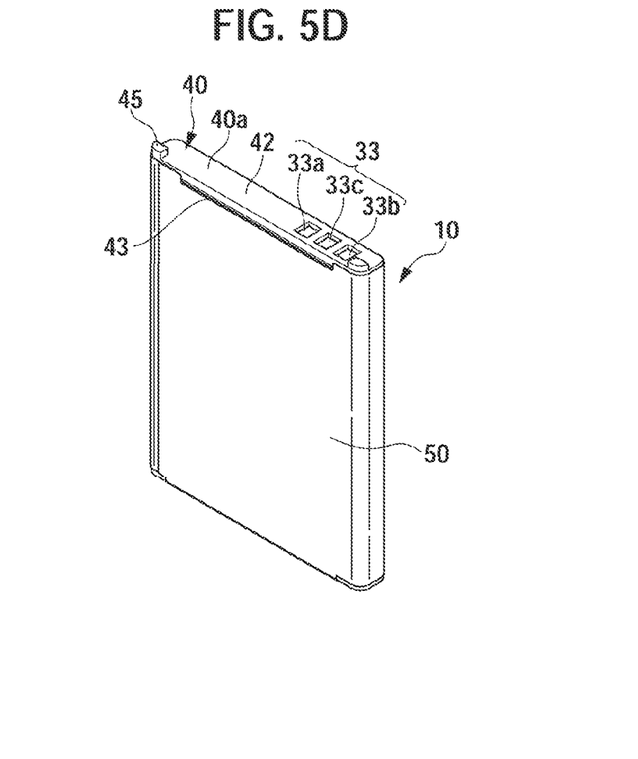
FIG. 5D is a diagram showing the manufacturing method of the battery shown in FIG. 1.

Thereafter, as shown in FIG. 5D, the label sheet 50 is adhered to the battery cell 20 and the covering member 40 that is installed in a coupled manner to the battery cell 20, with an adhesive member (not shown). Here, the label sheet 50 is a sticker member having the adhesive member that is applied in advance to a back face thereof. This allows the label sheet 50 to be easily adhered to the battery cell 20 and the covering member 40 by wrapping therearound.

Figure 6:
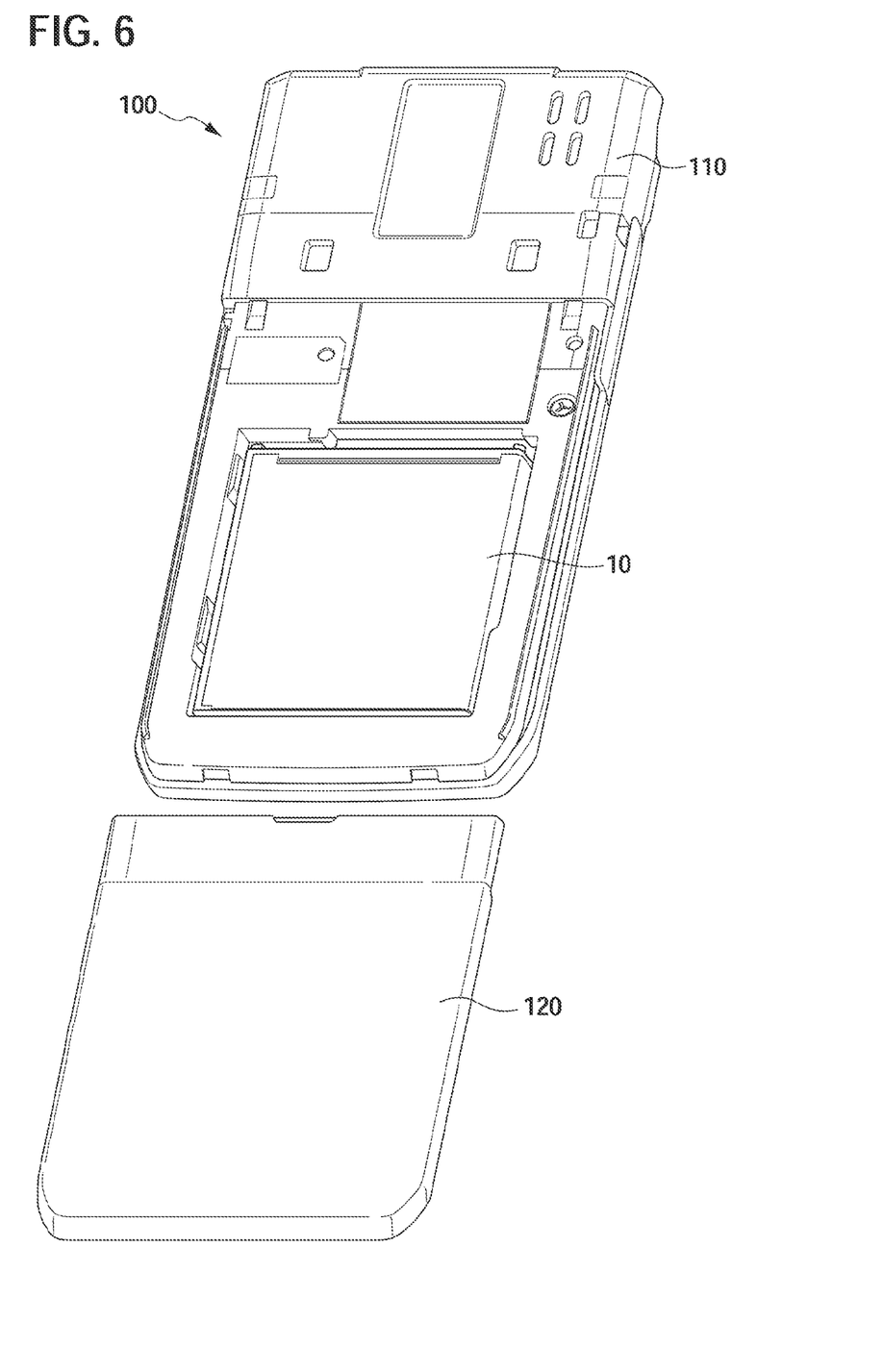
FIG. 6 is a perspective view showing a cellular telephone device provided with the battery shown in FIG. 1.

As shown in FIG. 6, the battery 10 of the present embodiment is preferably used as a power source for a cellular telephone device 100 as the portable electronic device. The cellular telephone device 100 is provided with a cellular telephone device main body 110, the battery 10 of the present embodiment that is mounted in the cellular telephone device main body 110, and a battery cover 120 that covers the battery 10 mounted in the cellular telephone device main body 110.

According to the above-described battery 10 of the present embodiment, the first covering portion 41 positioned below the circuit substrate 30 and the second covering portion 42 positioned above the circuit substrate 30 are connected by the connection portion 43, thereby integrally configuring the covering member 40. As a result, the number of components that are used for assembling the battery 10 can be reduced, compared to a case in which the first covering portion and the second covering portion are configured from separate components. This can lead to a reduction in the assembly man-hours in manufacturing of the battery 10. In addition, the reduction in the number of components can reduce component cost in manufacturing of the battery 10.

Furthermore, in the present embodiment, the first conductive member 31 is welded to the positive terminal 21 and the second conductive member 32 is welded to the negative terminal 22. As a result, the first covering portion 41 disposed between the first and second conductive members 31 and 32 and the battery cell 20 is reliably positioned at a predetermined position on the upper face 20*a* of the battery cell 20. In addition, the battery cell 20 and the covering member 40 can be firmly fixed to each other.

Moreover, in the present embodiment, welding of the first conductive member 31 to the positive terminal 21 and to the first substrate terminal 30*a*, and welding of the second conductive member 32 to the negative terminal 22 and to the second substrate terminal 30*b* are all performed by spot welding from the same direction. In other words, all the spot welding can be performed in one step, thereby reducing assembly man-hours.

Furthermore, in a border between the first covering portion 41 and the second covering portion 42, in which the first conductive member 31 and the second conductive member 32 are folded back, the connection portion 43 is not formed and the first covering portion 41 and the second covering portion 42 are separated from each other. As a result, when the covering member 40 is being folded, portions of the first conductive member 31 and the second conductive member 32 that are folded back do not contact the connection member 43 and do not hinder folding of the first conductive member 31 and the second conductive member 32.

Moreover, since the engaging portion 44 that engages the first covering portion 41 with the second covering portion 42 is provided in the covering member 40, the first covering portion 41 can be easily engaged with the second covering portion 42 and the closed state of the covering member 40 can be easily maintained.

In addition, a boundary portion between the battery cell 20 and the covering member 40 (the first covering portion 41) of the battery cell 20 with the covering member 40 attached, and a boundary portion between the first covering portion 41 and the second covering portion 42, including the engaging portion 44, are covered by the label sheet 50. As a result, an engaged state of the battery cell 20 and the covering member 40 can be firmer and an engaged state of the first covering portion 41 and the second covering portion 42 can be maintained firmly.

Although an embodiment of the present invention has been described above, the present invention is not limited to the aforementioned embodiment.

For example, the connection portion 43 of the cover member 40 can be provided in the vicinities of both end portions in a longitudinal direction of the first covering portion 41 and the second covering portion 42. In this case, a region in which the connection portion 43 is not provided can be formed in a central portion in a longitudinal direction of the first covering portion 41 and the second covering portion 42, and the first conductive member 31 and the second conductive member 32 can be disposed to span the first covering portion 41 and the second covering portion 42 at the region in which the connection portion 43 is not provided.

In addition, the first conductive member 31 and the second conductive member 32 are not limited to be substantially L-shaped, and may be I-shaped or the like.

Furthermore, the covering member is not limited to the label sheet 50 that is wrapped around, and adhered with the adhesive member to, the battery cell 20. In other words, the covering member may be formed with a tube-like film having heat-shrinkage properties and cover the battery cell 20, for example.

Moreover, in the present embodiment, the present invention is applied to the cellular telephone device 100 as the portable electronic device; however, the present invention is not limited thereto. Specifically, the present invention can be applied to other portable electronic devices, such as a personal digital assistant (PDA), a notebook PC, a digital camera, a portable audio player, and the like.

The invention claimed is:

1. A battery comprising:
    a battery cell having a positive terminal and a negative terminal that are disposed on one face thereof;
    a circuit substrate comprising a first substrate terminal and a second substrate terminal that are disposed to face the one face of the battery cell;
    a first conductive member that causes conduction between the positive terminal and the first substrate terminal;

a second conductive member that causes conduction between the negative terminal and the second substrate terminal; and a covering member that includes a first covering portion, a second covering portion, and a connection portion that foldably connects the first covering portion and the second covering portion such that the second covering portion is folded onto the first covering portion in a closed state, wherein, in the closed state, the first covering portion includes at least a part disposed between the circuit substrate and the battery cell, wherein the circuit substrate is configured to be interposed between the first covering portion and the second covering portion in the closed state, and wherein the circuit substrate is electrically connected to the one face of the battery cell in a state of being interposed between the first covering portion and the second covering portion.

2. The battery according to claim 1, wherein, in the closed state, the first substrate terminal and the second substrate terminal are disposed on a face of the circuit substrate on a side that faces the one face of the battery cell, and wherein the first conductive member and the second conductive member are each disposed across both the first covering portion and the second covering portion such that, in the closed state, the first conductive member and the second conductive member are both folded in a same direction as the first covering portion and the second covering portion.

3. The battery according to claim 1, wherein the first conductive member and the second conductive member are respectively joined with the positive terminal and the negative terminal, by way of welding from an intersection direction that intersects with the one face in a open state, and are respectively joined with the first substrate terminal and the second substrate terminal by way of welding from the intersection direction in the open state.

4. The battery according to claim 3, wherein the circuit substrate is supported by the second covering portion in a state in which the covering member is in the open state and the first covering portion is joined with the one face of the battery cell.

5. The battery according to claim 1, wherein the first covering portion comprises at least a first engaging portion and the second covering portion comprises at least a second engaging portion, and wherein, in the closed state, the first engaging portion and the second engaging portion engage each other to maintain the closed state.

6. The battery according to claim 1, wherein the first covering portion is positioned with respect to the battery cell by the first conductive member joined with the positive terminal and the second conductive member joined with the negative terminal.

7. A battery manufacturing method comprising:

attaching a foldable covering member in an open state to one face of a battery cell on which a positive terminal and a negative terminal are disposed, wherein the foldable covering member comprises a first covering portion, a second covering portion, and a connection portion that foldably connects the first covering portion and the second covering portion such that the second covering portion is folded onto the first covering portion in a closed state;

mounting a circuit substrate including a first substrate terminal and a second substrate terminal in the second covering portion in an open state;

causing conduction between the positive terminal and the first substrate terminal by mounting a first conductive member to the covering member in the open state, and causing conduction between the negative terminal and the second substrate terminal by attaching a second conductive member to the covering member in the open state; and covering the circuit substrate by folding the second covering portion in which the circuit substrate is mounted onto the first covering portion.

8. The battery manufacturing method according to claim 7, wherein, in the open state, the first conductive member and the second conductive member are welded respectively to the positive terminal and the negative terminal from an intersection direction that intersects with the one face, and are respectively welded to the first substrate terminal and the second substrate terminal from the intersection direction.

9. The battery manufacturing method according to claim 7, wherein the first covering portion comprises a first opening corresponding to the positive terminal and a second opening corresponding to the negative terminal, wherein causing conduction between the positive terminal and the first substrate terminal by mounting a first conductive member to the covering member in the open state comprises, in the open state, mounting the first conductive member across a boundary of the first covering portion and the second covering portion such that a first end portion of the first conductive member contacts the positive terminal via the first opening in the first covering portion and a second end portion of the first conductive member contacts the first substrate terminal of the circuit substrate mounted in the second covering portion, and wherein causing conduction between the negative terminal and the second substrate terminal by attaching a second conductive member to the covering member in the open state comprises, in the open state, mounting the second conductive member across a boundary of the first covering portion and the second covering portion such that a first end portion of the second conductive member contacts the negative terminal via the second opening in the first covering portion and a second end portion of the second conductive member contacts the second substrate terminal of the circuit substrate mounted in the second covering portion.

10. The battery manufacturing method according to claim 9, further comprising, in the open state:

welding the first end portion of the first conductive member to the positive terminal;

welding the second end portion of the first conductive member to the first substrate terminal;

welding the first end portion of the second conductive member to the negative terminal; and welding the second end portion of the second conductive member to the second substrate terminal.

11. The battery manufacturing method according to claim 10, wherein all of the weldings are performed in the same direction in one step.

12. The battery manufacturing method according to claim 10, wherein folding the second covering portion in which the circuit substrate is mounted onto the first covering portion further includes:

folding the welded second end portion of the first conductive member onto another portion of the first conductive member, and folding the welded second end portion of the second conductive member onto another portion of the second conductive member.

13. A portable electronic device having a portable electronic device main body and a battery mounted in the portable electronic device main body, wherein the battery comprises:
- a battery cell having a positive terminal and a negative terminal that are disposed on one face thereof;
- a circuit substrate comprising a first substrate terminal and a second substrate terminal that are disposed to face the one face of the battery cell;
- a first conductive member that causes conduction between the positive terminal and the first substrate terminal;
- a second conductive member that causes conduction between the negative terminal and the second substrate terminal; and
- a covering member that includes a first covering portion, a second covering portion, and a connection portion that foldably connects the first covering portion and the second covering portion such that the second covering portion is folded onto the first covering portion in a closed state,
- wherein, in the closed state, the first covering portion includes at least a part disposed between the circuit substrate and the battery cell,
- wherein the circuit substrate is configured to be interposed between the first covering portion and the second covering portion in the closed state, and
- wherein the circuit substrate is electrically connected to the one face of the battery cell in a state of being interposed between the first covering portion and the second covering portion.

* * * * *